US006308655B1

(12) United States Patent
Oosterling

(10) Patent No.: US 6,308,655 B1
(45) Date of Patent: Oct. 30, 2001

(54) DEVICE AND METHOD FOR MILKING ANIMALS

(75) Inventor: Pieter Adriaan Oosterling, Nieuw-Vennep (NL)

(73) Assignee: Prolion B.V. (NL)

( * ) Notice: Subject to any disclaimer, the term of this patent is extended or adjusted under 35 U.S.C. 154(b) by 0 days.

(21) Appl. No.: 09/331,979

(22) PCT Filed: Dec. 17, 1997

(86) PCT No.: PCT/NL97/00707

§ 371 Date: Sep. 10, 1999

§ 102(e) Date: Sep. 10, 1999

(87) PCT Pub. No.: WO98/28969

PCT Pub. Date: Jul. 9, 1998

(30) Foreign Application Priority Data

Dec. 31, 1996 (NL) .................................... 1004921

(51) Int. Cl.[7] .................................... A01J 5/06; A01J 7/02
(52) U.S. Cl. .......................................... 119/14.08
(58) Field of Search ................... 119/14.02, 14.08, 119/14.18, 14.36, 14.47, 14.49

(56) References Cited

U.S. PATENT DOCUMENTS

| 1,089,839 | * | 3/1914 | Hulbert | 119/14.02 |
| 2,334,481 | * | 11/1943 | Da Silveira | 119/14.47 |
| 4,034,713 | * | 7/1977 | Umbaugh | 119/14.08 |
| 5,134,967 | * | 8/1992 | Marshall | 119/14.47 |
| 5,161,482 | * | 11/1992 | Griffin | 119/14.02 |
| 5,275,124 | * | 1/1994 | Van Der Lely et al. | 119/14.08 |
| 5,568,788 | * | 10/1996 | Van Den Berg et al. | 119/14.08 |

FOREIGN PATENT DOCUMENTS

| 0277396 | 8/1988 | (EP) . |
| 0430526 | 6/1991 | (EP) . |
| 0657098 | 6/1995 | (EP) . |

* cited by examiner

Primary Examiner—Charles T. Jordan
Assistant Examiner—Elizabeth Shaw
(74) Attorney, Agent, or Firm—Webb Ziesenheim Logsdon Orkin & Hanson, P.C.

(57) ABSTRACT

A device is provided for the automatic milking of animals. The device includes milk cups with an inner wall which at the topside possibly encloses an upper chamber and at the bottom continues as a milkline provided during milking with underpressure. The upper chamber and possibly the milkline are connected with one or more uninterrupted lines with an air supply. By supplying air to the topside of the milk cup during milking, the milk cup does not creep upward during milking to prevent the milk cup pinching the milk supply to the teats.

19 Claims, 4 Drawing Sheets

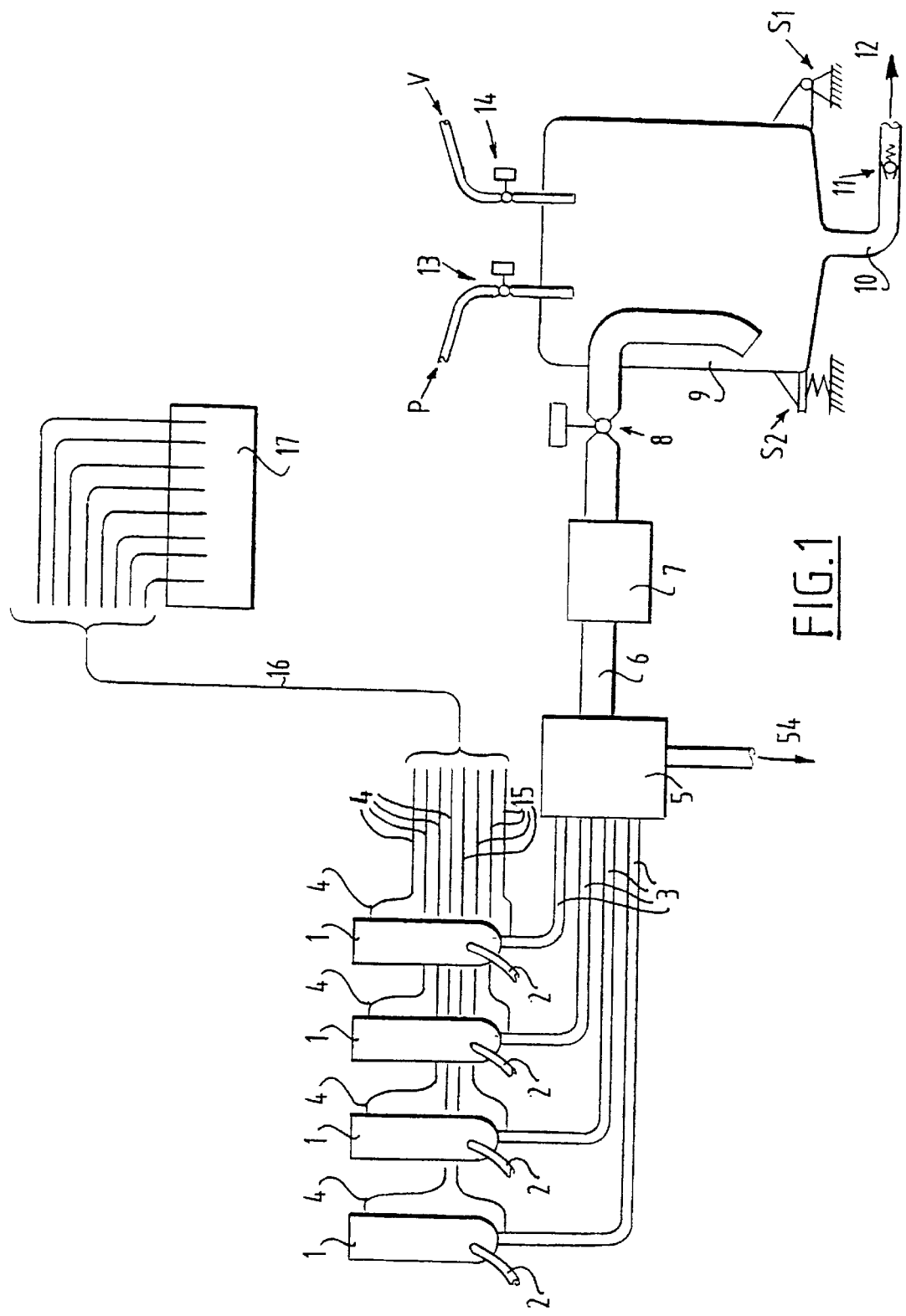

DEVICE AND METHOD FOR MILKING ANIMALS

BACKGROUND OF THE INVENTION

The invention concerns a device according to the preliminary part of claim 1.

Such a device is known from EP 0277396. The disadvantage of the known device is that as a result of the underpressure in the milk cup the milk cup moves upwardly along the teat and can pinch the milk flow from the udder to the teat. This disadvantage arises when the leakage-air supply to the upperchamber, which is the upper part of the milk cup, is insufficiently warranted, as the teatdiameter determines how much air flows into and out of the upperchamber. One of the consequences can be that in the upperchamber the full underpressure of the milkline arises which increases the chance that the milk cup creeps upwardly which causes the teat to be pinched off.

SUMMARY OF THE INVENTION

In order to create a controlled supply of leakage air in a simple and dependent way the device conforms to the characterising part of claim 1.

In this way in a simple manner the combination of dosing of rinsing fluid and dosing of air is made whereby the milk cup remains simple in design.

From EP 0430526 it is known to supply air to the upperchamber via a tube. In this known device the air supply to the topside of the milk cup is used to remove the milk cup from the teat of the cow. The air supply is not used during milking and certainly not for preventing the upwardcreep of the milk cups along the teats.

In accordance with a further improvement, the dosing means are executed such that they dose rinsing fluid after underpressure has been created in the first supply line, for instance by attaching the milk cup around a teat. In this way rinsing fluid is only dosed after a teat has been brought into the milk cup. This means that very little rinsing fluid can be dosed because it can be done during a limited time period and exactly on the suitable moment during the start of the milking of a teat.

In accordance with an embodiment the dosing means comprise a container with rinsing fluid wherein the first supply line can be submerged. In this way the rinsing fluid is dosed in the first supply line in a simple way and is transported through the underpressure to the topside of the milk cup.

In accordance with a further improvement the container is movable between a first position whereby the container is submerged in rinsing fluid and a second position whereby the first supply line is submerged in the container. Herewith the dosing is realised with simple mechanical means, whereby the volume of the container is the maximum quantity of rinsing fluid to be dosed.

According to an other aspect of the invention the first supply line is connected with an adjustable air supply. Herewith the supply of the quantity of air to the upperchamber at the top of the milk cup can be adjusted to the teat of the cow milked at that instance.

In accordance with a further improvement there are means for determining the identity of the animal to be milked and means for adjusting the adjustable air supply according to the identity of the animal to be milked. In this way before starting the air supply to the milk cup can be adjusted, and can be adjusted to the diameter and the length of the teats of the animal. In this way it is prevented in a simple way that an animal is troubled by upwardly creeping teat cups.

In accordance with an embodiment the adjustable air supply comprises an adjustable restriction. So in a simple way a controlled pressure in the upperchamber of the teat cup is attained.

In accordance with another embodiment the adjustable air supply comprises a pressure source with an adjustable pressure. In this way the pressure in the upperchamber can be controlled independently of the quantity of air alongside the teat and the milk cup.

According to another aspect of the invention the milkline is provided with at least one opening connected with a second supply line connected in a similar way as the first supply line with the air supply for during milking supplying air and possibly for at the milking start dosing of rinsing fluid with the dosing means. In this way it is attained that the air supply to the milkline is through a tube so that there is no contamination in this air supply, and so that also plugging of the airsupply openings can be avoided. These openings can also be cleaned with the rinsing fluid.

According an improved embodiment the first supply line and the second supply line are connected via a T-piece with the airsupply. In this way therewover a part or possibly the main part of the line a combined supply, which makes a more simple embodiment.

In accordance with another aspect of the invention between the milk cup and the receptacle for milk a filter is provided with a filter element and provided with bypass means for placing the filter element outsides the milkstream. In this way it can be chosen whether the contamination that at the start flows with the milk, such as the dried milk from the teat openings, will be caught on a filter element or that it will be passed directly to the drain without passing the filter. By not guiding part of the milk stream through the filter element after the first contamination has been caught the caught contamination will not be taken up in the fluid. In this way as little as possible of the contamination will come into the milk which improves the milk quality.

In accordance with an embodiment the bypass means comprise a short-circuit line over the filter element with a valve. In this way it is reached in a simple way that the milk stream is passed around the filter element.

In accordance with another embodiment the bypass means comprise a slide wherein the filter element is encompassed. In this way the filter element can be taken quickly out of the line and the milk stream can continue to flow through the same line whereby the underpressure in the drainage line does not change.

In accordance with another embodiment rinsing means are provided for cleaning the filter element. In this way in a simple way the filter element can be cleaned while it remains mounted in the filter.

In accordance with another aspect of the invention the topside of the milk cup is detachable from the flexible movable inner-wall, and is made of silicones rubber. By separating the flexible movable inner-wall and the topside of the milk cup they can be made of different materials. So it is possible to make the topside of the milk cup of silicones rubber so that the teats slide easily into the teatopening. The flexible movable inner-wall will then be made of customary material, which is a bit rough but proof against the flexible movements.

The invention also comprises a method in accordance with the preliminary part of claim 16. Such a method is known from the earlier discussed European patent application EP 0430526. The disadvantage of the known method is that the milk cup can creep up along the teat and pinch the milk flow from the udder to the teat.

In accordance with the invention after attachment of the milk cup continuously air is dosed into the topside of the milk cup, alternatively or optionally preceded by dosing of a rinsing fluid. In this way the above mentioned disadvantage is taken away and is assured that always sufficient leakage air is available to flow along the flexible inner wall to the milkline.

In accordance with a further improvement by dosing air the airpressure in the topside of the milk cup is kept at a value which is characteristic for the animal to be milked. So it is assured that the airsupply is adapted to the teatdiameter and the teatlength of the animal to be milked, which causes the airsupply to be adapted accurately to the creepage conduct of the milk cup.

In accordance with a further improvement of the method for the milking of animals with a device whereby between the milk cup and the receptacle for milk a filter is placed with a filter element and provided with bypass means for placing the filter element outside of the milkstream. According to the improvement the first part of the fluid flowing to the receptacle for milk is passed through the filter element and the remaining part of the fluid is passed asides it. By guiding merely a part of the fluid flowing to the receptacle through the filter element all main contamination will be filtered out. If all milk would be guided through this filter element part of the contamination would go into solution again. This concerns especially the bacteria in the contamination, which would reduce the quality of the milk in the milk-tank. By guiding only the most contaminated milk and that is in most cases the first milk, through the filter the number of bacteria is kept as low as possible.

BRIEF DESCRIPTION OF THE DRAWINGS

The invention is illustrated hereafter according to several embodiments that are described with the help of a drawings wherein FIG. 1 shows a schematic view of a milking device.

In the various figures for the same parts as much as possible the same numbers are used.

DESCRIPTION OF THE PREFERRED EMBODIMENTS

Figure 2A:
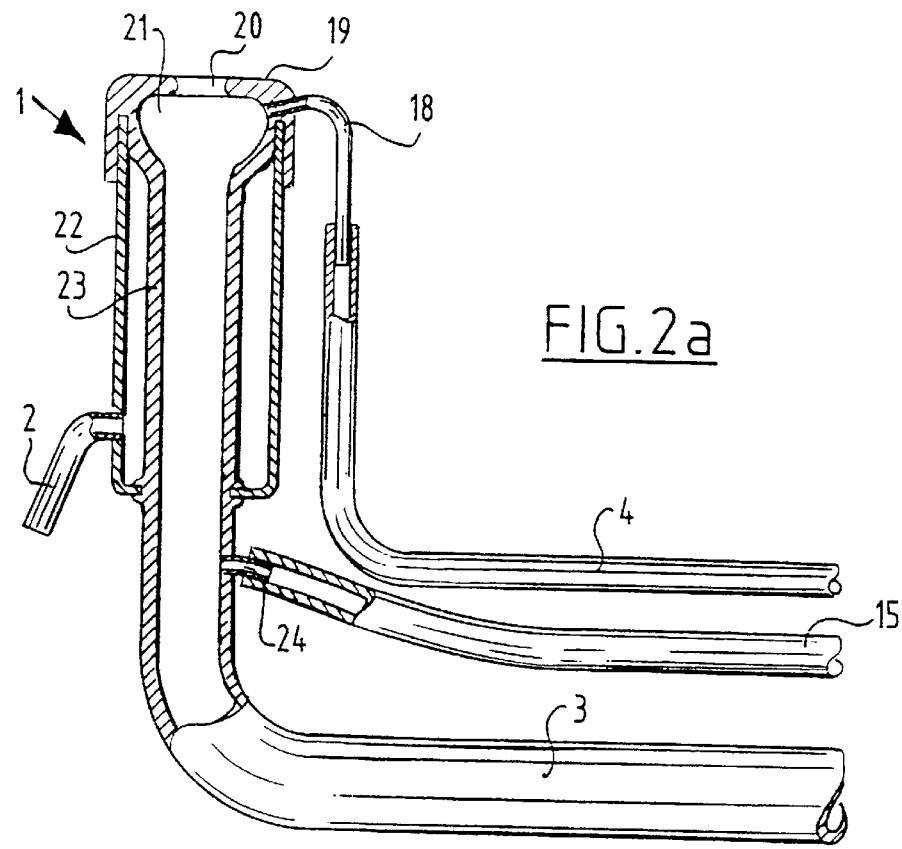
FIG. 2a shows a section of a milk cup as can be used in the milking device according to FIG. 1.

FIG. 1 shows a schematic view of a milking device for instance for cows, whereby milk cups 1 can be attached in known manner to the udder of the animal. The milk taken from the udder flows through an outlet 3 to a collector 5. In the collector 5 not shown electrical controlled 3-way valves are mounted in a known manner which connect the outlet 3 via a milkline 6 with a milkvessel 9 or with a drain 54, which drain 54 may comprise a not shown storage vessel wherein for instance mastitis milk or the first-milk from a teat can be stored. At a later moment this milk is given for instance to calves.

In the drain 54 and the milkvessel 9 an underpressure V is provided in a hereafter shown manner. The 3-way valve makes sure that only good milk is guided to the milkvessel 9, and that for instance mastitis milk or the hereafter to be discussed rinsing fluid is guided to the drain 54. This 3-way valve can be switched after the milking has been started during a pre-selectable time, so that the contaminated milk and possibly the hereafter to be discussed rinsing fluid is removed from the milkline. Also it is possible that in the milk cup 1 or in the outlet 3 in a known way sensors are attached, which give a signal whether the detected milk is good or contaminated milk, which signal is used for controlling the 3-way valve.

The collector 5 can be made in such a way that there is for each outlet 3 a separate 3-way valve. An alternative embodiment can be whereby the collector 5 is made in such a way that there is one 3-way valve and that the outlets 3 come together before the 3-way valve.

The four milk cups 1 are each provided in a known way with a pulsation line 2. The in the milk cups 1 received milk comes together in the collector 5 and continues to flow via the milkline 6 and a first-milk filter 7 to the milkvessel 9. The bottom of the milkvessel 9 is provided with a tankline 10 which is connected via a check valve 11 with a milk tank 12, which is not shown. At the topside the milkvessel 9 is connected via a valve 13 with a pressure source P and via a valve 14 with a vacuum source V. The milkvessel 9 is supported on a hinge S1 and a weight sensor S2.

During milking the valve 13 is closed and valve 14 is opened so that the milkvessel 9 is exposed to the underpressure V. This causes the check valve 10 to be closed. A valve 8 is opened so that the milkline 6 and the outlet 3 are also exposed to under pressure and the milk can be transported from the milk cup 1 to the milkvessel 9. The drain 54 is in a way not shown connected with the vacuumsource V, so that the position of the 3-way valves that are part of collector 5 does not influence the underpressure in the outlet 3.

In order to improve the milktransport in the outlet 3 in the milk cup 1 an upper leakage line 4 is attached where through leakage air can come into the topside of the milk cup 1. In the outlet 3 directly under the milk cup 1 a lower leakage line 15 is attached for further improvement of the liquid transport. The leakage lines 4 and 15 are connected via a bundle 16 to a rinsing fluid supply 17 placed above the milking parlour. In the rinsing fluid supply 17 the lines 16 are connected with the surrounding air and can suck up rinsing fluid in a later discussed way. As the rinsing fluid supply 17 is positioned above the milking parlour the air sucked through the lines 16 is relatively clean, as the dirt is mainly near the floor. The leakage lines 4 and 15 are shown here as separate lines up to the cleaning liquid supply 17, however it is also possible that the lines are connected near the milk cups 1, for instance all lines 4 together and all lines 15 together. Most advantageously the lines 4 and 15 are combined to one line with a T-piece near the milk cup 1 which has the advantage that the air flow and the rinsing fluid supply that is to discussed hereafter can be controlled for each milk cup separately and that there is only one line to a milk cup 1.

After the milking is finished, the milk cups 1 have been removed from the teats and the quantity removed milk is weighted with the weight sensor S2 the milkvessel 9 is emptied through closing the valve 8, closing the valve 14 where through the vacuum source V is disconnected from the milkvessel 9 and opening the valve 13 which causes the milkvessel 9 to be pressurised and the milk via tankline 10 and the checkvalve 11 to be forced to the milktank 12. By pumping the milk with air pressure from the milkvessel 9 to the milktank 12 it is prevented that milk is pressed with high speed through narrow openings as often happens in mechanical pumps. This prevents damage to the milkmolecules, which improves the quality and the keeping qualities of the milk.

The discussed embodiment of a milking device is preferably used in situations where the milk cups 1 are attached around teats of the udder by an automatic position and attachment system as for instance a milk robot. In that situation there is no direct supervision by the farmer and the discussed additional measures are necessary to ensure that the quality of the milk that is stored in the milking tank 12 remains good. In that situation the first-milk, which is at the bottom end of the teats, cannot be milked out by hand before attaching the milk cups, as is done by a farmer in the standard milkprocess. As the discussed embodiment also has further and later to be discussed advantages application in conventional milking installations is also possible.

In FIG. 2a has been indicated more detailed how the upper leakage line 4 is connected with an upper leakage connection 18 to an upperchamber 21. The upperchamber 21 is an in a upper rim 19 of the milk cup 1 attached enlargement of a flexible inner-wall 23 immediately under a teat opening 20, and ensures in a known way that there remains some underpressure at the topside of the flexible inner wall 23.

When the flexible inner-wall 23 encloses the teat sealingly there is no air drain from the top of the milk cup, but there is air supply along the gap between teat and teat opening 20. This causes the pressure at that position to rise so that the milk cup could fall off. This pressure rise is reduced by the upperchamber 21. The upper leakage line 18 causes the underpressure in the upper chamber 21 not to become too deep, which prevents that the teat opening 20 would pinch the teat too much through creeping upwards of the milk cup 1. After applying underpressure via the pulsation line 2, the enclosure of the flexible inner wall 23 around the teat is reduced and air and possibly fluid transport can take place via the upperchamber 21 along the teat whereby the rinsing fluid ensures a better sealing between the teat and the flexible inner wall 23 and weakens the skin of the teat somewhat. The contamination that is forced out of the teat, so as for instance the dried milk that is in the teat opening, comes against the inside wall of the flexible inner-wall 23 and the outlet 3 and is rinsed away by possibly the rinsing fluid and the milk. In the outlet 3 near the milk cup 1 the lower leakage line 15 is attached with a lower leakage connection 24 wherethrough also leakage air or fluid can be supplied, which improves the transport through the outlet 3.

The openings for the supply of leakage air are in the upperchamber 21 about 4 mm in diameter, as a consequence of this the underpressure in the upperchamber 21 with normal teat dimensions has an average value of underpressure of about 10 kPa. This underpressure can be influenced by restricting the air supply through line 4 or by additional pressure in the line. The opening in the outlet 3 has a diameter of about 0.7 mm, which causes with an underpressure V in this outlet line of 42 kPa sufficient air stream for transport of the fluid in the line. The small opening of 0.7 mm can be blocked easily, for instance by sucking in of dirt. Such a blockage often is not observed by the farmer, even while the milking is not going smoothly. By connecting the opening to a line and rinsing this line periodically blockage is prevented.

Figure 2B:
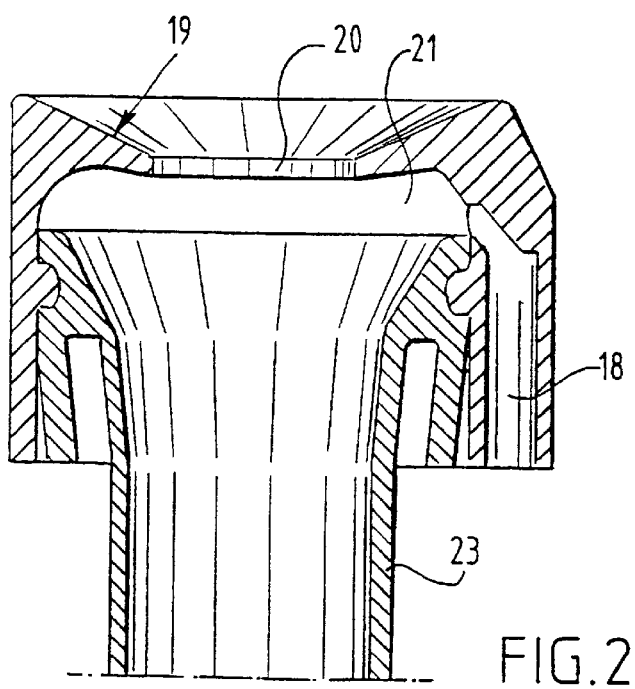
FIG. 2b shows an alternative embodiment of rubber parts of the milk cup according to FIG. 2a, FIGS. 3 and 4 show a top view and a cross section of the rinsing water supply as can be used in the milking device according to FIG. 1, FIGS. 5 and 6 show a long and a cross section of a first-milk filter as can be used in the milking device according to FIG. 1.

In FIG. 2b a different embodiment of the rubber parts of the milk cup 1 is shown. Due to the pulsating movement that is required for milking, the flexible inner wall 23 is usually made of nytrile rubber, as it has been shown that other types of rubber cannot realise the required durability. Even with the special type of rubber these flexible inner walls must be changed several times each year. It has been shown that for the inserting of the teats in the teatopening 20 it is advantageous to make the upperrim 19 as smooth as possible, as this causes the teat to slide easier into the opening. This is reached by making the upperrim 19 of silicones rubber. This material is very smooth and strong and can be fixed tight around the flexible inner wall 23. Also the topside is somewhat cone shaped which makes it more easy for the teat to slide into the teat opening 20. When changing the flexible inner wall 23 due to wear it is not necessary to change the upperrim 19 as well.

Figure 3:
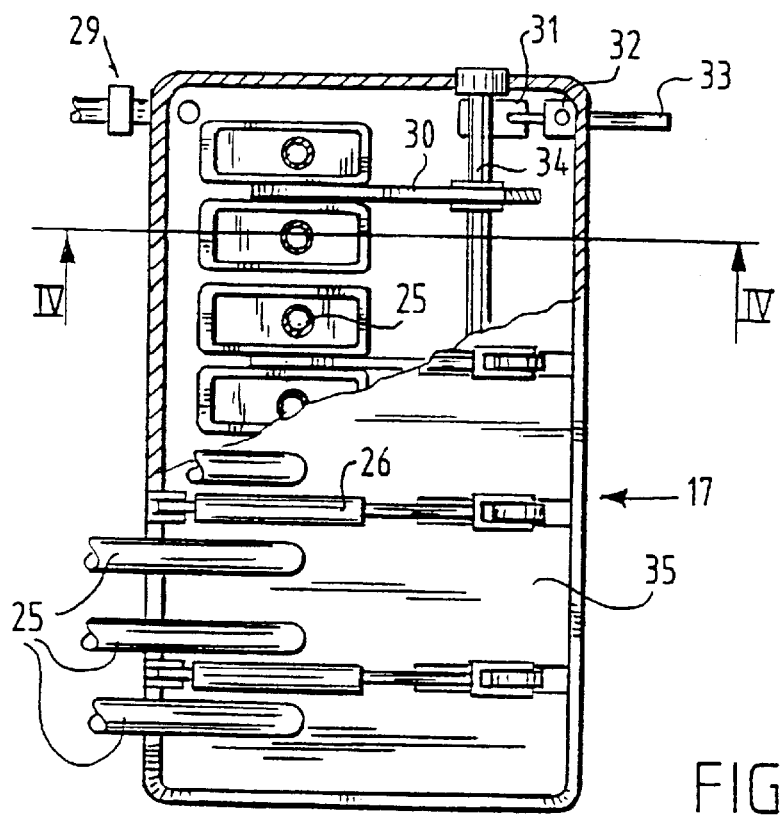
Figure 4:
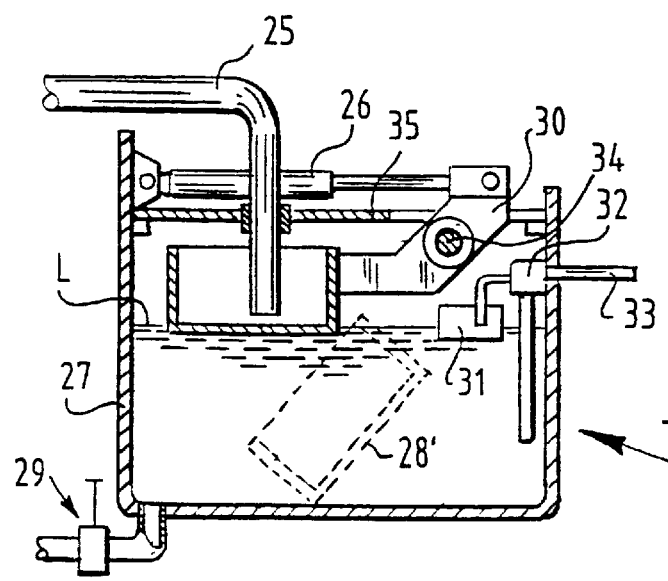

In FIGS. 3 and 4 there is shown an embodiment of the rinsing water supply 17. In a rinsing water reservoir 27 there is rinsing water such as clean tapwater, up to a rinsing water level L, which rinsing water is supplied via a watersupply 33, whereby a float 31 moves a valve 32 in such a way that the rinsing water level L during use is more or less constant. Via a drain 29 the rinsing water reservoir 27 can be emptied for instance when the device is cleaned periodically.

In the rinsing water reservoir 27 two cups 28 are fixed to one of the levers 30, which levers 30 are pivotal with a drive 26 around an axis 34. Thereby the cup 28 can be brought in an upper position whereby the upper rim of the cup is above the rinsing water level L.

Also the cup can be brought into a lower position 28' whereby the cup 28 fills with rinsing water.

In the wall of the rinsing water reservoir 27 a tube 25 is attached, whereby the part of the tube that is outside the reservoir is connected with the leakage lines 16 and the other end of the tube ends directly above the rinsing water level L. In the upper position of the cup 28 the tube 25 ends in the cup and can suck the fluid out. The topside of the rinsing water reservoir 27 is closed with a closure 35, which prevents contamination of the rinsing fluid. In the closure are openings for air supply, so that when there is underpressure in the leakage lines 16 and the connected tubes 25 air or fluid can be sucked up.

In the shown embodiment for each leakage line there is a cup 28, whereby two cups 28 have been connected with a lever 30. In this way it is possible that the rinsing water supply is for each milk cup 1 separately and that in the milk cup 1 and in the outlet 3 a determined quantity of water is dosed at the moment that can be determined for each milk cup separately.

Depending on the circumstances there are several alternatives, for instance that for all milk cups 1 the cups 28 are filled simultaneously with rinsing fluid and that depending on the underpressure in the leakage line 16 for each milk cup 1 the fluid is sucked up. It is then possible to have one drive for all cups 28. Another alternative is for instance that several leakage lines 16 suck from the same cup, or that several leakage lines 16 can suck leakage air only and others can suck leakage air and also are supplied with water dosing by means of the cups 28.

This latest situation is preferably used when it has to be avoided that the teats in the milk cup 1 are moistened. The disadvantage of the moistening of the teats is that they get more sensitive to infections because of weakening of the skin. Through the moistening the sealing of the rubber of the milk cup 1 around the teat is stronger which reduces the amount of leakage air along the teat which in some situations is disadvantage. The supply of water is then directly below the milk cup 1, so that the dirt that comes from and off the teat is rinsed away as much as possible. The fluid volume that is sucked up by the tube 25 is adjustable through varying the immersion of the tube 25 and the dimensions of the cup 28. A customary value is 50 cc for each milk cup as this gives a satisfactory rinsing effect.

In another embodiment the rinsing water dosing can be made such that directly when underpressure arises in the outlet 3 that then in the upperchamber 21 rinsing fluid, for instance water, is dosed, which improves the seal between teat and flexible inner-wall 23 strongly and which reduces sucking out of air out of the upperchamber 21. This has the advantage that an underpressure arises quicker under the teat, whereby the milk cup 1 remains better attached to the udder. The supply of leakage air and possibly during a short time of the water through opening 24 ascertains that in all circumstances through the outlet 3 sufficient transport to the milkvessel 9 or the drain 54 can take place.

Herefor rinsing fluid has been discussed, which usually will be clean water. However it is also possible that with a not shown dosing device for consumption suitable preservation means or disinfecting means are added to the fluid in the rinsing water reservoir 27, in order to prevent that in the rinsing water reservoir bacteria growth starts and that via this fluid undesired bacteria enter into the milk. In the situation that there is more than one milking parlour and more than one rinsing water reservoir 27 it is possible that only one float system for the rinsing water supply for the various reservoirs is used, and that the rinsing water reservoirs 27 are connected as communicating vessels.

In addition to the shown embodiment of the air supply in the lines to the milk cup 1, other more complicated embodiments are possible whereby the air supply to the upperchamber 21 can be determined more accurately, so that the air pressure in the upperchamber 21 is kept at an accurate value, independent of the identity of the animal to be milked and the dimensions of her teats.

In an embodiment for this the rinsing water reservoir 27, wherein the lines 16 end, can be kept at an underpressure, for instance 10 kPa underpressure and the lines 16 will than have a relatively large diameter, so that there is no flow loss. It is possible that the underpressure is adjustable depending on the in the controlsystem known identity of the animal. Thereby the underpressure in the upperchamber 21 is adjusted to the animal and the teat. In that situation there flow for each teat different quantities leakage air along the teatcup opening 21 and the teat and along the flexible inner-wall 23 and the teat, as this depends on the teat diameter and the teat length. By adjusting the pressure in the upperchamber 21 these differences are incorporated and the creepage in upper direction of the milk cup 1 along the teat is prevented.

According to another embodiment in the opening of the line 16 near the rinsing water reservoir 27 or near the milk cup 1 a possibly adjustable restriction is incorporated, which together with the expected air flow induces the required pressure drop. It is also possible that this adjustable restriction can be controlled electronically in the light of the in the control system known identity of the animal to be milked. In addition to the embodiment discussed here the same effect can also be realised with other techniques known from control systems.

Figure 5:
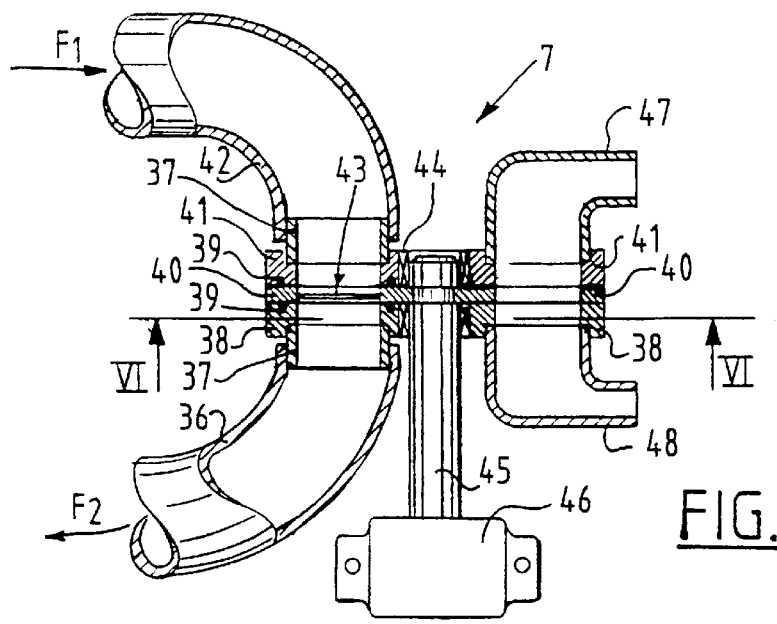
Figure 6:
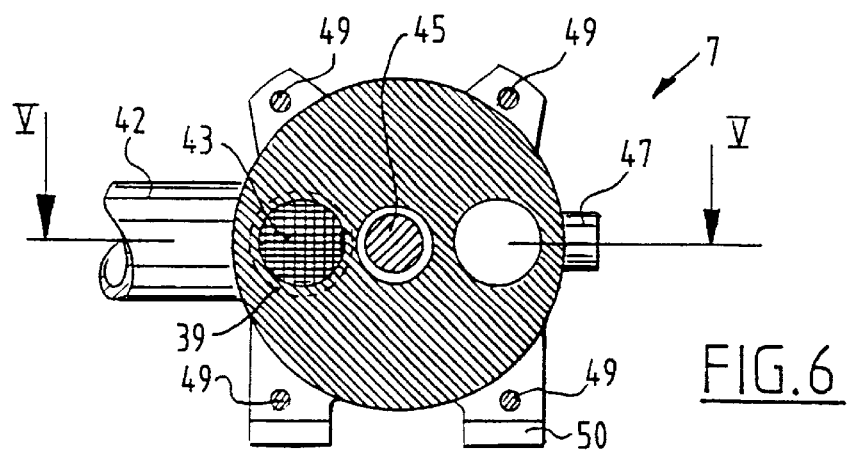

In FIGS. 5 and 6 is a first-milk filter 7 shown whereby a filterelement 43 is mounted in a filterdisk 40. The filterdisk 40 is placed between a first filterhouse 38 and a second filterhouse 41 and can be rotated through a swivel axis 45, located in bearings 44, over at least 180° by a swiveldrive 46. The first filterhouse 38 and the second filter house 41 are connected to each other among others with a couplingbolt 49 and are standing on a support 50.

The filterdisk 40 is provided with 2 holes diametrically opposite to each other, whereby in at least one of these holes a filterelement 43 is placed.

In the second filterhouse 41 a connection piece 37 is attached on which a line 42 from the collector 5 is coupled, which line 42 is similar to the line 6 from FIG. 1. In the first filterhouse 38 directly opposite this also a connecting piece 37 is placed upon which a line 36 to the milkvessel 9 is coupled. By rotating the filterdisk 40 the filter element 43 can be placed in a milk stream from the milk cups 1, indicated with F1. The milkstream from the filter 7 to the milkvessel 9 is indicated with F2. In the first filterhouse 38 and the second filterhouse 41 a seal 39 is provided, which ensures that there is no airsupply to the milkline between the filterhouse and the filterdisk 40. Diametrically opposite of the swivel axis 45 is in the first filterhouse 38 a washwater supplyline 48 attached and in the second filterhouse 48 a washwater drainline 47. With this the filterelement 43 can be rinsed clean.

It is possible that before the filter element 43 is rinsed clean that than with not shown sensors is established whether the filterelement is contaminated, and can be determined with what it is contaminated so that it can be determined whether one of the teats is infected with mastitis. If this is ascertained it can be memorised in the control system or it is possible that direct action is taken by for instance ending the milking and placing the cow in a separate area.

Figure 7:
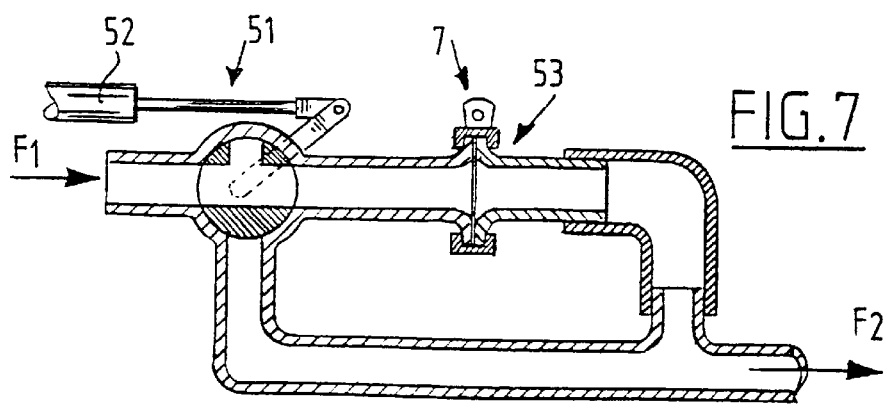
FIG. 7 shows a simplified embodiment of the first-milk filter as can be used in the milking device according to FIG. 1.

In FIG. 7 an alternative embodiment of the first milk filter 7 is shown. Hereby the milkstream F1 is guided with a three way valve 51 through a filter 53 or after switching of the three way valve 51 with a drive 52 around the filter 53. It will be clear that the filter 53 must be cleaned periodically by hand and that there are also no means for detecting the kind of contamination on the filter. It is possible to measure the amount of contamination of the filter in a simple way by measuring the pressure difference over the filter.

The before described first-milk filters 7 can be used for the complete milk stream of a cow, as has been discussed here, it is however also possible that such a filter is placed directly after each milk cup separately, so that the fluid flow of each teat is filtered independently of the other teats. The use of the filter 7 can also be adapted to the health situation of the herd and the aimed hygiene of the milk. Thereby it is possible to filter esspecially the first fluid which comes out of the milk cups so that the dirt is kept out of the system. Also it is possible that the first fluid is guided unfiltered to the drain 54 and that the milk which goes to the milk-vessel 9 is filtered completely.

What is claimed is:
1. A device for the automatic milking of animals, comprising:
   a milk cup with an outer-wall and a flexible inner-wall configured to be attached around a teat of an animal and which continues at a bottom of the milk cup as a milkline provided during milking with an underpressure, which milkline is provided with a valve for alternately connecting the milk cup with a receptacle for milk and a drain, wherein the flexible inner-wall at a topside is provided with at least one opening which is coupled to a first supply line and which is provided with dosing means for dosing of rinsing fluid, wherein the first supply line is also embodied as an airsupply for supplying air during milking.

2. The device according to claim 1, wherein the dosing means are configured to dose rinsing fluid after underpressure has been created in the first supply line.

3. The device according to claim 1, wherein the dosing means comprise a container with rinsing fluid in which the first supply line is submersible.

4. The device according to claim 3, wherein the container is movable between a first position in which the container is submerged in the rinsing fluid and a second position in which the first supply line is submerged in the container.

5. The device according to claim 1, wherein the first supply line is connected with an adjustable air supply.

6. The device according to claim 5, including means for determining the identity of the animal to be milked, and for adjusting the adjustable air supply according to the identity of the animal to be milked.

7. The device according to claim 5, wherein the adjustable air supply comprises an adjustable restriction.

8. The device according to claim 5, wherein the adjustable air supply comprises a pressure source with an adjustable pressure.

9. The device according to claim 1, wherein the milk line is provided with at least one opening being connected with a second supply line, which is connected in a similar way as the first supply line with the air supply in order to supply air during milking, and possibly to dose rinsing fluid with the dosing means at the start of the milking.

10. The device according to claim 9, wherein the first supply line and the second supply line are connected via a T-piece with the air supply.

11. The device in accordance with claim 1, wherein between the milk cup and the receptacle for milk a filter is provided with a filter element and comprising bypass means for placing the filter element outside a milkstream.

12. The device in accordance with claim 11, wherein the bypass means comprise a short-circuit line over the filter element with a valve.

13. The device according to claim 11, wherein the bypass means comprise a slide wherein the filter element is encompassed.

14. The device in accordance with claim 13, including rinsing means for cleaning the filter element.

15. The device according to claim 1, wherein the topside of the milk cup is detachable from the flexible movable inner-wall and is made of silicone rubber.

16. The device according to claim 1, wherein the flexible inner-wall at the topside is provided with an upperchamber.

17. A method for milking of animals in which a milk cup with an outer-wall and a flexible inner-wall is placed around a teat of an animal to be milked, which milk cup continues at a bottom as a milk line provided during milking with underpressure and wherein the flexible inner-wall at the topside is coupled via at least one opening to a first supply line, wherein via the first supply line after the attachment of the milk cup air is dosed continuously into the topside of the milk cup, alternatively preceded by dosing of a rinsing fluid.

18. The method according to claim 17, wherein by dosing air the air pressure in the topside of the milk cup is kept at a value which is characteristic for the animal to be milked or the relevant teat.

19. The method for milking animals as claimed in claim 17, wherein a first part of fluid that flows to a receptacle for milk is passed through a filter element and the remaining part of the fluid is passed around the filter element.

* * * * *